Patented May 6, 1947

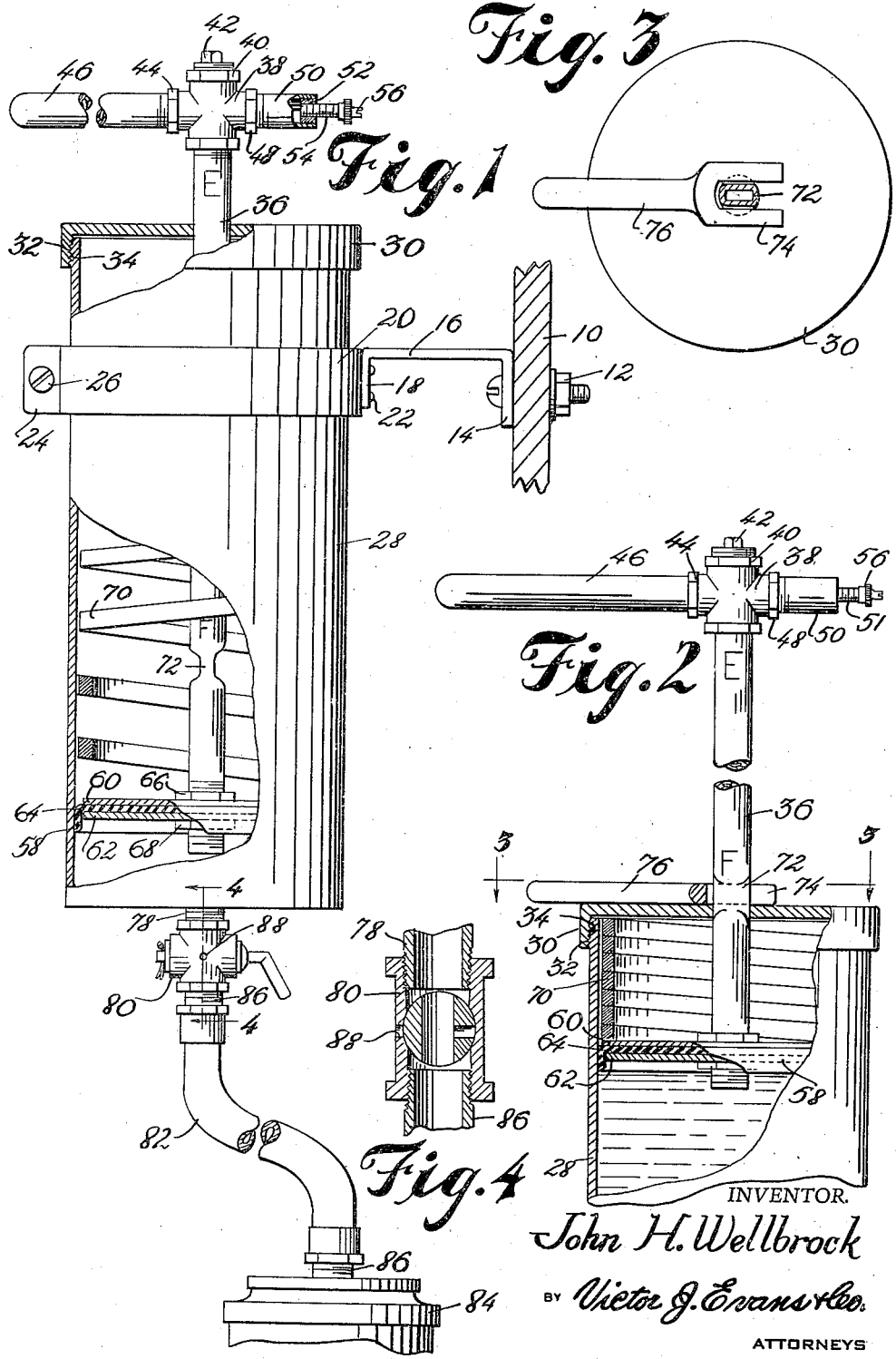

2,419,977

UNITED STATES PATENT OFFICE 2,419,977

BRAKE FLUID CONTROL APPARATUS

John H. Wellbrock, Queens Village, N. Y.

Application May 14, 1945, Serial No. 593,722

4 Claims. (Cl. 60—54.6)

This invention relates to a brake fluid control apparatus to be used in conjunction with hydraulic brakes on motor vehicles.

An object of the invention is to provide a device that will require but one person to bleed the brakes.

Another object of the invention is to provide a device that will keep air out of the brake lines.

A further object of the invention is to provide a device having pressure supplying means incorporated therein whereby with use of such pressure said device can detect leaks in the brake system.

A still further object of the invention is to provide a device that can function as a reserve tank for brake fluid.

A still further object of the invention is to provide a device that will indicate when the oil supply is low and needs to be replenished.

With these and other objects and advantages in view the invention consists in the novel construction, arrangement and formation of parts as will be hereinafter more specifically described, claimed and illustrated in the accompanying drawings in which:

Fig. 1 is a side elevation partly broken away of an embodiment of the invention showing the tank empty and connected to the master cylinder of a hydraulic brake system.

Fig. 2 is the same showing the tank full and the piston locked in raised position.

Fig. 3 is a sectional view on the line 3—3 of Fig. 2, and

Fig. 4 is a sectional view along the line 4—4 of Fig. 1.

Referring more in detail to the drawing the numeral 10 designates a part of a motor vehicle to which is connected by means of a bolt and nut 12 one dependent end 14 of a substantially U-shaped bucket 16 the other dependent end 18 of which is secured to a circular support 20 by means of rivets 22 or other similar fastening means.

The support 20 is vertically split and the ends are bent at an angle thereto to form apertured ears 24 which are adapted to receive a bolt 26 which when tightened will securely hold the cylindrical tank 28 therein.

The tank is provided with a removable apertured cover 30 which is threaded internally at 32 to engage the complementary threads 34 adjacent the top of the tank 28.

Reciprocatably mounted in the cover 30 is a pipe 36 which is provided at its upper end with a T-coupling 38.

The top opening 40 of the coupling 38 is provided with a removable filler plug 42 through which fluid is poured to fill the tank 28 by means of the pipe 36.

The opening 44 of the coupling 38 has a handle 46 removably connected thereto while the opening 48 of the coupling 38 has a short pipe 50 connected thereto at one end, the other end of the pipe 50 is internally threaded to receive an adapter 52 for connection with a conventional air valve 54 having a dust cap 56 removably connected to the other end thereof.

The lower end of the pipe 36 is externally threaded to receive the plunger 58 which comprises upper and lower steel washers 60 and 62 respectively and the intermediate cup washer 64 these being held in position on the pipe 36 by upper and lower nuts 66 and 68 respectively.

A coil spring 70 of a circumference slightly smaller than the tank 20 is positioned therein and is interposed between the cover 30 and the upper steel washer 60. This spring 70 applies pressure at all times to the plunger 58 thereby keeping the fluid in the tank 20 under pressure at all times.

At a position in the pipe when the spring 70 is fully compressed is a pinched portion 72 which is adapted to be received in the forked end 74 of a locking bar 76. The function and operation of which will be later explained.

The bottom of the tank 20 has an opening therein to receive the short threaded nipple 78 to which is connected a petcock 80.

A flexible pipe 82 connects the petcock 80 to the master cylinder 84 of the hydraulic system of a motor vehicle by means of coupling 86.

One side of the petcock 80 has an air hole 88 drilled therein and when the petcock 80 is in closed position the hole 88 functions to vent the master cylinder 84 to allow the brake fluid to flow freely, as in normal operation of hydraulic brakes, that is, without brake fluid control apparatus.

After the tank 20 has been connected to the master cylinder 84 and it is desired to place the device in operation, the petcock 80 is closed and the pipe 36 is pulled upwards by means of the handle 46 against the pressure of the spring 70, or air can be admitted through air valve 54 to raise the plunger 58, when the fork 74 of the locking bar 76 can be inserted into the pinched portion 72 of the pipe 36.

The filler plug 42 can then be removed and the tank 20 can be filled with fluid. Air which has been admitted through valve 54 will be allowed to escape during the filling of the tank 20 with fluid. When the pipe is thus locked in position the letter F on the pipe 36 is visible indicating that the tank is full or ready to be filled thus in conjunction with the letter E positioned on the pipe 36 adjacent the T-coupling 38 the pipe 36 will act as a gauge to indicate the height of the fluid in the tank 20.

When the tank 20 has been filled the locking bar 76 is removed and the plunger 58 will thus place pressure on the fluid by means of the spring 70 and even pressure will be maintained thereon at all times.

Upon opening of the petcock 80 the fluid will enter the master cylinder 84 under pressure.

When it is desired to bleed the lines pressure can be applied to the fluid by pressure on the handle 46 or by admitting air into the tank 20 by means of the air valve 54. Thus one man can bleed the lines at any time due to the pressure supplied by the device.

It will be understood, therefore, by those skilled in the art that the device accomplishes the objects of the invention, and that changes and modifications of the shape, size and arrangement of the various parts may be made to the embodiment of the invention herein shown and described, without departing from the spirit of the invention or the scope of the appended claims.

Having thus described the invention, what is claimed as new and desired to be secured by Letters Patent is:

1. A device of the character described comprising a cylindrical tank having an apertured removable cover, a pipe reciprocably mounted in said tank, a plunger at one end of said pipe, a T-coupling at the other end of said pipe having a handle, a filler plug and an air valve connected thereto, a spring in said tank interposed between said cover and said plunger, means for connecting said tank to the master cylinder of a motor vehicle and means for mounting said tank to the motor vehicle.

2. The invention as described in claim 1, wherein means is provided for locking said plunger in raised position within said tank.

3. The invention as described in claim 1, wherein means for controlling a supply of liquid from said tank to said master cylinder is interposed in said connecting means.

4. The invention as described in claim 1, wherein said controlling means is provided with means for venting said master cylinder.

JOHN H. WELLBROCK.

REFERENCES CITED

The following references are of record in the file of this patent:

UNITED STATES PATENTS

| Number | Name | Date |
|---|---|---|
| 2,102,833 | Carroll | Dec. 21, 1937 |
| 985,899 | Janney | Mar. 7, 1911 |